(12) United States Patent
Freiberg et al.

(10) Patent No.: US 11,829,383 B2
(45) Date of Patent: *Nov. 28, 2023

(54) SYSTEMS AND METHODS FOR DATA REPLICATION SYNCHRONIZATION

(71) Applicant: Palantir Technologies Inc., Palo Alto, CA (US)

(72) Inventors: Stephen Freiberg, Palo Alto, CA (US); Alexander Landau, Palo Alto, CA (US); Andrew Greene, Palo Alto, CA (US); Brian Dorne, San Francisco, CA (US); Bryan Offutt, Palo Alto, CA (US); Ernest Zeidman, Palo Alto, CA (US); Ilya Nepomnyaschchiy, Mountain View, CA (US); John Garrod, San Mateo, CA (US); Katherine Brainard, East Orange, NJ (US); Kolin Purcell, San Francisco, CA (US); Michael Levin, Bethesda, MD (US); Simon Swanson, San Francisco, CA (US); Spencer Stecko, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/517,481

(22) Filed: Nov. 2, 2021

(65) Prior Publication Data

US 2022/0058209 A1    Feb. 24, 2022

Related U.S. Application Data

(63) Continuation of application No. 16/359,398, filed on Mar. 20, 2019, now Pat. No. 11,163,795, which is a
(Continued)

(51) Int. Cl.
*G06F 16/27*    (2019.01)
*G06F 7/02*    (2006.01)

(52) U.S. Cl.
CPC ............ *G06F 16/273* (2019.01); *G06F 7/02* (2013.01)

(58) Field of Classification Search
CPC .......... G06F 16/273; G06F 7/02; G06F 16/27
See application file for complete search history.

(56) References Cited

U.S. PATENT DOCUMENTS 5,548,749 A    8/1996 Kroenke et al.
5,708,828 A    1/1998 Coleman
(Continued)

FOREIGN PATENT DOCUMENTS

AU    2011279270 A1    1/2013
EP    0816968 A2    1/1998
(Continued)

OTHER PUBLICATIONS

Dell Latitude D600 2003, Dell Inc., http://www.dell.com/downloads/global/products/latit/en/spec_latit_d600_en-.pdf.
(Continued)

*Primary Examiner* — Dinku W Gebresenbet
*Assistant Examiner* — Dustin D Eyers
(74) *Attorney, Agent, or Firm* — Sheppard Mullin Richter & Hampton LLP

(57) ABSTRACT

Systems and methods are provided for storing a first data object comprising a first set of immutable components, the first data object being associated with a corresponding second data object stored by a remote replication system. A difference is determined between the first set of immutable components of the first data object and a second set of immutable components of the corresponding second data object. A subset of immutable components is identified from
(Continued)

the first set of immutable components based on the difference. The subset of immutable components from the first set of immutable components is provided to the remote replication system over a communication network.

20 Claims, 8 Drawing Sheets

Related U.S. Application Data continuation of application No. 15/456,256, filed on Mar. 10, 2017, now Pat. No. 10,262,053.

(60) Provisional application No. 62/438,190, filed on Dec. 22, 2016.

(56) References Cited

U.S. PATENT DOCUMENTS

| | | | |
|---|---|---|---|
| 5,765,171 A | 6/1998 | Gehani et al. |
| 5,870,761 A | 2/1999 | Demers et al. |
| 6,098,078 A | 8/2000 | Gehani et al. |
| 6,190,053 B1 | 2/2001 | Stahlecker et al. |
| 6,202,085 B1 | 3/2001 | Benson et al. |
| 6,216,140 B1 | 4/2001 | Kramer |
| 6,240,414 B1 | 5/2001 | Beizer et al. |
| 6,317,754 B1 | 11/2001 | Peng |
| 6,374,252 B1 | 4/2002 | Althoff et al. |
| 6,539,381 B1 | 3/2003 | Prasad et al. |
| 6,560,620 B1 | 5/2003 | Ching |
| 6,816,941 B1 | 11/2004 | Carlson et al. |
| 6,993,539 B2 | 1/2006 | Federwisch et al. |
| 7,072,911 B1 | 7/2006 | Doman |
| 7,167,877 B2 | 1/2007 | Balogh et al. |
| 7,437,664 B2 | 10/2008 | Borson |
| 7,596,285 B2 | 9/2009 | Brown et al. |
| 7,676,788 B1 | 3/2010 | Ousterhout et al. |
| 7,730,396 B2 | 6/2010 | Chidlovskii et al. |
| 7,818,297 B2 | 10/2010 | Peleg et al. |
| 7,877,421 B2 | 1/2011 | Berger et al. |
| 7,962,495 B2 | 6/2011 | Jain et al. |
| 8,015,151 B2 | 9/2011 | Lier et al. |
| 8,290,990 B2 | 10/2012 | Drath et al. |
| 8,301,904 B1 | 10/2012 | Gryaznov |
| 8,312,546 B2 | 11/2012 | Alme |
| 8,316,060 B1 | 11/2012 | Snyder et al. |
| 8,380,659 B2 | 2/2013 | Zunger |
| 8,442,940 B1 | 5/2013 | Faletti |
| 8,515,912 B2 | 8/2013 | Garrod et al. |
| 8,527,461 B2 | 9/2013 | Ducott, III et al. |
| 8,646,080 B2 | 2/2014 | Williamson et al. |
| 8,688,749 B1 | 4/2014 | Ducott, III et al. |
| 8,726,379 B1 | 5/2014 | Stiansen et al. |
| 8,782,004 B2 | 7/2014 | Ducott, III et al. |
| 8,838,538 B1 | 9/2014 | Landau et al. |
| 8,886,601 B1 | 11/2014 | Landau et al. |
| 9,009,827 B1 | 4/2015 | Albertson et al. |
| 9,275,069 B1 | 3/2016 | Garrod et al. |
| 9,330,157 B2 | 5/2016 | Ducott, III et al. |
| 9,444,798 B1 | 9/2016 | Wang |
| 11,163,795 B2 | 11/2021 | Freiberg et al. |
| 2003/0084017 A1 | 5/2003 | Ordille |
| 2003/0088654 A1 | 5/2003 | Good et al. |
| 2004/0103124 A1 | 5/2004 | Kupkova |
| 2004/0111390 A1 | 6/2004 | Saito et al. |
| 2004/0250576 A1 | 12/2004 | Flanders |
| 2005/0034107 A1 | 2/2005 | Kendall et al. |
| 2005/0108063 A1 | 5/2005 | Madill et al. |
| 2005/0193024 A1 | 9/2005 | Beyer et al. |
| 2006/0036568 A1 | 2/2006 | Moore et al. |
| 2006/0106879 A1 | 5/2006 | Zondervan et al. |
| 2006/0155945 A1 | 7/2006 | McGarvey |
| 2006/0190497 A1 | 8/2006 | Inturi et al. |
| 2006/0206866 A1 | 9/2006 | Eldrige et al. |
| 2006/0218637 A1 | 9/2006 | Thomas et al. |
| 2006/0224579 A1 | 10/2006 | Zheng |
| 2007/0005707 A1 | 1/2007 | Teodosiu et al. |
| 2007/0026373 A1 | 2/2007 | Suriyanarayanan et al. |
| 2007/0112887 A1 | 5/2007 | Liu et al. |
| 2007/0168516 A1 | 7/2007 | Liu et al. |
| 2007/0180075 A1 | 8/2007 | Chasman et al. |
| 2007/0220067 A1 | 9/2007 | Suriyanarayanan et al. |
| 2007/0220328 A1 | 9/2007 | Liu et al. |
| 2007/0233756 A1 | 10/2007 | D'Souza et al. |
| 2007/0288533 A1 | 12/2007 | Srivastava |
| 2007/0299887 A1 | 12/2007 | Novik et al. |
| 2008/0027981 A1 | 1/2008 | Wahl |
| 2008/0033753 A1 | 2/2008 | Canda et al. |
| 2008/0086718 A1 | 4/2008 | Bostick et al. |
| 2008/0141117 A1 | 6/2008 | King et al. |
| 2008/0148398 A1 | 6/2008 | Mezack et al. |
| 2008/0189240 A1 | 8/2008 | Mullins et al. |
| 2008/0235575 A1 | 9/2008 | Weiss |
| 2008/0243951 A1 | 10/2008 | Webman et al. |
| 2008/0320299 A1 | 12/2008 | Wobber et al. |
| 2009/0172821 A1 | 7/2009 | Daira et al. |
| 2009/0199090 A1 | 8/2009 | Poston et al. |
| 2009/0254970 A1 | 10/2009 | Agarwal et al. |
| 2010/0100963 A1 | 4/2010 | Mahaffey |
| 2010/0145909 A1 | 6/2010 | Ngo |
| 2010/0330801 A1 | 12/2010 | Rouh |
| 2011/0010342 A1 | 1/2011 | Chen et al. |
| 2011/0173155 A1 | 7/2011 | Becchi |
| 2011/0219450 A1 | 9/2011 | McDougal et al. |
| 2011/0246229 A1 | 10/2011 | Pacha |
| 2012/0005159 A1 | 1/2012 | Wang et al. |
| 2012/0016849 A1* | 1/2012 | Garrod .................. G06F 16/273 707/E17.007 |
| 2012/0023075 A1 | 1/2012 | Pulfer et al. |
| 2012/0036106 A1 | 2/2012 | Desai et al. |
| 2012/0254129 A1 | 10/2012 | Wheeler et al. |
| 2013/0006655 A1 | 1/2013 | Van Arkel et al. |
| 2013/0006668 A1 | 1/2013 | Van Arkel et al. |
| 2013/0067017 A1 | 3/2013 | Carriere et al. |
| 2013/0097595 A1 | 4/2013 | Stern et al. |
| 2013/0173540 A1 | 7/2013 | Qian et al. |
| 2013/0191336 A1 | 7/2013 | Ducott, III |
| 2013/0191338 A1 | 7/2013 | Ducott, III et al. |
| 2013/0276799 A1 | 10/2013 | Davidson |
| 2013/0346444 A1 | 12/2013 | Makkar et al. |
| 2014/0011000 A1 | 1/2014 | Dunkmann et al. |
| 2014/0040182 A1 | 2/2014 | Gilder et al. |
| 2014/0040714 A1 | 2/2014 | Siegel et al. |
| 2014/0081652 A1 | 3/2014 | Klindworth |
| 2014/0114972 A1 | 4/2014 | Ducott et al. |
| 2014/0129518 A1 | 5/2014 | Ducott et al. |
| 2014/0149130 A1 | 5/2014 | Getchius |
| 2014/0250066 A1 | 9/2014 | Calkowski et al. |
| 2014/0358812 A1 | 12/2014 | Hourte |
| 2015/0074050 A1 | 3/2015 | Landau et al. |
| 2015/0227582 A1* | 8/2015 | Gu ....................... G06F 16/2453 707/713 |
| 2015/0235334 A1 | 8/2015 | Wang et al. |
| 2015/0261847 A1 | 9/2015 | Ducott, III et al. |
| 2016/0019252 A1 | 1/2016 | Ducott et al. |
| 2016/0092491 A1 | 3/2016 | Cowling |
| 2017/0171060 A1 | 6/2017 | Liu |
| 2018/0181637 A1 | 6/2018 | Freiberg et al. |

FOREIGN PATENT DOCUMENTS

| | | |
|---|---|---|
| EP | 1647908 A2 | 4/2006 |
| EP | 2911078 A2 | 8/2015 |
| NL | 2011642 A | 4/2014 |
| WO | 2008113059 A1 | 9/2008 |
| WO | 2011161565 A1 | 12/2011 |
| WO | 2012009397 A2 | 1/2012 |

OTHER PUBLICATIONS

Dou et al., "Ontology Translaation on the Semantic Web 2005," Springer-Verlag, Journal on Data Semantics II Lecture Notes in Computer Science, vol. 3350, pp. 35-37.

(56) References Cited

OTHER PUBLICATIONS

Fidge, Colin J., "Timestamps in Message-Passing Systems," K. Raymond (Ed.) Proc. of the 11th Australian Computer Science Conference (ACSC 1988), pp. 56-66.
Holliday, JoAnne, "Replicated Database Recovery using Multicast Communication," IEEE 2002, pp. 11.
Lamport, "Time, Clocks and the Ordering of Events in a Distributed System," Communications of the ACM, Jul. 1978, vol. 21, No. 7, pp. 558-565.
Loeliger, Jon, "Version Control with Git," O'Reilly, May 2009, pp. 330.
Mattern, F., "Virtual Time and Global States of Distributed Systems," Cosnard, M., Proc. Workshop on Parallel and Distributed Algorithms, Chateau de Bonas, France:Elsevier, 1989, pp. 215-226.
Notice of Allowance for U.S. Appl. No. 13/657,684 dated Mar. 2, 2015.
Notice of Allowance for U.S. Appl. No. 14/156,208 dated Feb. 12, 2016.
Notice of Allowance for U.S. Appl. No. 14/286,485 dated Jul. 29, 2015.
Notice of Allowance for U.S. Appl. No. 14/334,232 dated Nov. 10, 2015.
Notice of Allowance for U.S. Appl. No. 14/473,860 dated Jan. 5, 2015.
Official Communication for Canadian Patent Application No. 2806954 dated Jan. 15, 2016.
Official Communication for European Patent Application No. 14159175.0 dated Feb. 4, 2016.
Official Communication for European Patent Application No. 15155845.9 dated Oct. 6, 2015.
Official Communication for European Patent Application No. 15156004.2 dated Aug. 24, 2015.
Official Communication for U.S. Appl. No. 13/657,684 dated Aug. 28, 2014.
Official Communication for U.S. Appl. No. 14/076,385 dated Jan. 22, 2015.
Official Communication for U.S. Appl. No. 14/076,385 dated Jun. 2, 2015.
Official Communication for U.S. Appl. No. 14/076,385 dated Jan. 25, 2016.
Official Communication for U.S. Appl. No. 14/156,208 dated Mar. 9, 2015.
Official Communication for U.S. Appl. No. 14/156,208 dated Aug. 11, 2015.
Official Communication for U.S. Appl. No. 14/156,208 dated Sep. 17, 2015.
Official Communication for U.S. Appl. No. 14/286,485 dated Mar. 12, 2015.
Official Communication for U.S. Appl. No. 14/286,485 dated Apr. 30, 2015.
Official Communication for U.S. Appl. No. 14/334,232 dated Jul. 10, 2015.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/518,757 dated Dec. 1, 2015.
Official Communication for U.S. Appl. No. 15/456,256 dated Aug. 28, 2017.
Official Communication for U.S. Appl. No. 15/456,256 dated Jun. 16, 2017.
Official Communication for U.S. Appl. No. 15/456,256 dated Mar. 22, 2018.
O'Sullivan, Bryan, "Making Sense of Revision Control Systems," Communications of the ACM, Sep. 2009, vol. 52, No. 9, pp. 57-62.
OWL Web Ontology Language Reference Feb. 4, W3C, http://www.w3.org/TR/owl-ref/.
Parker, Jr. et al., "Detection of Mutual Inconsistency in Distributed Systems," IEEE Transactions in Software Engineering, May 1983, vol. SE-9, No. 3, pp. 241-247.
Symantec Corporation, "E-Security Begins with Sound Security Policies," Announcement Symantec, Jun. 14, 2001.
Summons to attend oral proceedings for EP Application 17204503.1 dated Apr. 16, 2021, 8 pages.

* cited by examiner

SYSTEMS AND METHODS FOR DATA REPLICATION SYNCHRONIZATION

CROSS REFERENCE TO RELATED APPLICATIONS

This application is continuation of U.S. application Ser. No. 16/359,398, filed Mar. 20, 2019, which is a continuation of U.S. application Ser. No. 15/456,256, filed Mar. 10, 2017, now U.S. Pat. No. 10,262,053 B2, which claims the benefit under 35 U.S.C. § 119(e) of U.S. Provisional Application Ser. No. 62/438,190 filed Dec. 22, 2016, the content of which is incorporated by reference in its entirety into the present disclosure.

BACKGROUND

Technical Field

This disclosure relates to approaches for data replication and data synchronization.

Description of Related Art

Under conventional approaches, data synchronization within a distributed computing environment may be resource and time intensive. For example, data may be replicated from one database to another database, but depending upon the size of the database, the size of the individual objects stored in the database, and the quality of the communication network, replication may take hours or even days.

SUMMARY

A claimed solution rooted in computer technology overcomes problems specifically arising in the realm of computer technology. In various implementations, a computing system is configured to obtain, store, and provide data objects. The data objects may include, or otherwise be associated with, one or more immutable components (e.g., a media file that cannot be modified). Some or all of the data objects, and/or associated immutable components, may be associated with one or more corresponding data objects stored by one or more remote computing systems. Data objects may be replicated to remote computing systems either periodically or on-demand (e.g., in response to user scheduling) over a communication network so that the data objects may be synchronized or otherwise brought into conformity. However, in some embodiments, network quality may be poor (e.g., high latency and/or low bandwidth). In order to reduce transfer times and/or transfer sizes, the computing system may identify a set of immutable components (e.g., particular immutable components that are resource expensive in terms of size and/or time), and determine if a remote computing system is already associated with any of those immutable components (e.g., has local stored copies of those immutable components). If the remote computing system is associated with any of the immutable components, the computing system may provide one or more respective identifiers (e.g., a string value and a hash value) for each of the already associated immutable components to the remote computing system, rather than providing the immutable components. The remote computing system may use the respective identifier(s) to identify corresponding immutable components (e.g., local copies), and associate the corresponding immutable components with the corresponding data object.

Various embodiments of the present disclosure include systems, methods, and non-transitory computer readable media configured to store a first data object comprising a first set of immutable components, the first data object being associated with a corresponding second data object stored by a remote replication system. A difference is determined between the first set of immutable components of the first data object and a second set of immutable components of the corresponding second data object. A subset of immutable components is identified from the first set of immutable components based on the difference. The subset of immutable components from the first set of immutable components is provided to the remote replication system over a communication network.

In some embodiments, each immutable component of the first set of immutable components and each immutable component of the second set of immutable components are associated with a respective unique identifier and a respective hash value.

In some embodiments, the determining a difference between the first set of immutable components of the first data object and a second set of immutable components of the corresponding second data object comprises comparing at the respective unique identifiers and the respective hash values to the respective unique identifiers and the respective hash values of the corresponding second object; and determining the difference based on the comparison.

In some embodiments, the providing the subset of immutable components from the first set of immutable components to the remote replication system over the communication network facilitates an update of the second data object using the subset of immutable components, the update causing the remote replication system to add the subset of immutable components to the second set of immutable components.

In some embodiments, the facilitating the update of the second data object using the subset of immutable components comprises causing the remote replication system to add the subset of immutable components to the second set of immutable components, and remove the immutable components of the second set of immutable components corresponding to the subset of immutable components.

In some embodiments, the communication network comprises a low-quality communication network. In some embodiments, the first set of immutable components comprises one or more immutable components selected based on a respective file size relative to a threshold size value.

In some embodiments, the first set of immutable components comprises one or more immutable components selected based on a respective predicted transfer time relative to a threshold transfer time value. In related embodiments, the threshold value comprises a dynamic threshold size value determined based on one or more performance characteristics of the communication network. In related embodiments, the one or more performance characteristics comprise any of latency or bandwidth.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Under conventional approaches, data synchronization within a distributed computing environment may be resource and time intensive. For example, data may be replicated from one database to another database, but depending upon the size of the database, the size of the individual objects stored in the database, and the quality of the communication network, replication may take hours or even days.

A claimed solution rooted in computer technology overcomes problems specifically arising in the realm of computer technology. In various implementations, a computing system is configured to obtain, store, and provide data objects. The data objects may include, or otherwise be associated with, one or more immutable components (e.g., a media file that cannot be modified). Some or all of the data objects, and/or associated immutable components, may be associated with one or more corresponding data objects stored by one or more remote computing systems. Data objects may be replicated to remote computing systems either periodically or on-demand (e.g., in response to user scheduling) so that the data objects may be synchronized or otherwise brought into conformity. For example, the data objects may be replicated over a communication network. However, in some embodiments, network quality may be poor (e.g., high latency and/or low bandwidth). In order to reduce transfer times and/or transfer sizes, the computing system may identify a set of immutable components (e.g., particular immutable components that are resource expensive in terms of size and/or time), and determine if a remote computing system is already associated with any of those immutable components (e.g., has local stored copies of those immutable components). If the remote computing system is associated with any of the immutable components, the computing system may provide one or more respective identifiers (e.g., a string value and a hash value) for each of the already associated immutable components to the remote computing system, rather than providing the immutable components. The remote computing system may use the respective identifier(s) to identify corresponding immutable components (e.g., local copies), and associate the corresponding immutable components with the corresponding data object.

Immutable Component Replication

Figure 1:
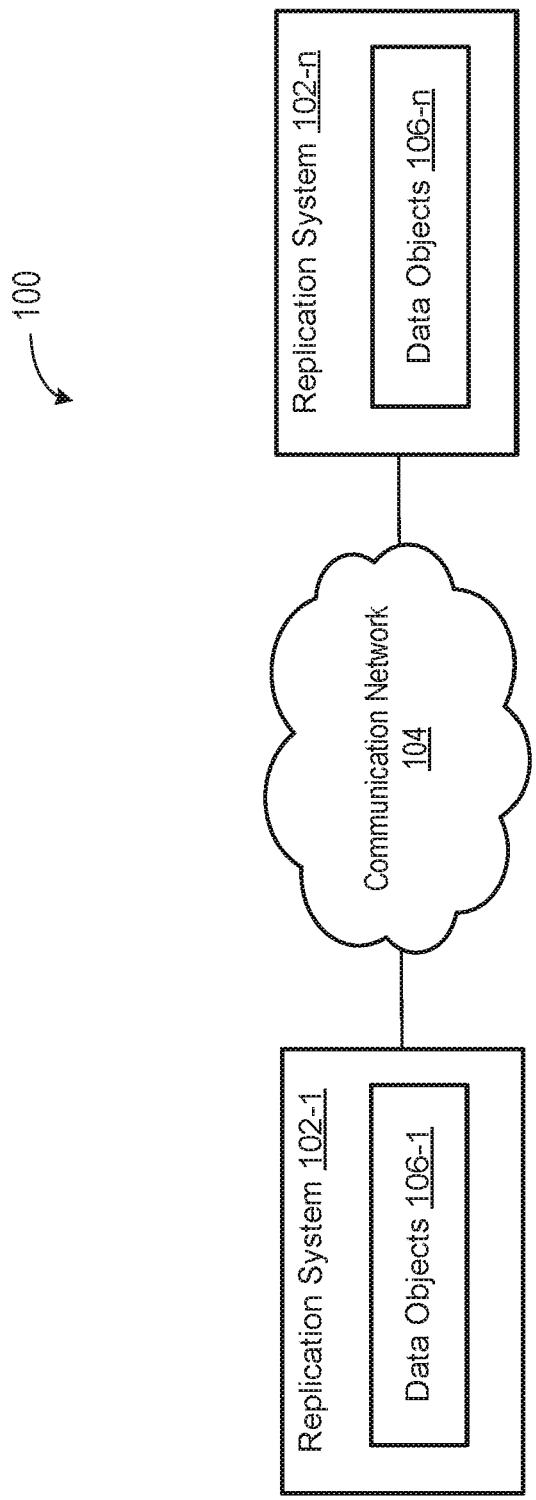
FIG. 1 depicts a diagram of an example of a system for sharing data objects between replication systems according to some embodiments.

FIG. 1 depicts a diagram of an example of a system 100 for sharing data objects between replication systems according to some embodiments. The example system 100 shown in FIG. 1 includes replication systems 102-1 to 102-$n$ (individually, the replication system 102, collectively, the replication systems 102), and a communication network 104.

In the example of FIG. 1, the replication systems 102 function to share data over the communication network 104. In various embodiments, functionality of the replication systems 102 can be performed by one or more servers, workstations, desktop computers, laptop computers, mobile devices (e.g., smartphone or tablet computer), and the like. The replication systems 102 may be geographically distributed across any number of geographic area, or may be within the same geographic area (e.g., a particular data center).

In the example of FIG. 1, the replication systems 102 function to store corresponding data objects 106-1 to 106-$n$ (individually, the data object 106, collectively, the objects 106). In some embodiments, the data objects 106 may represent copies of a same body of data. The body of data may be, for example, one or more tables in a relational database. However, the embodiments described herein are not limited to relational databases, and any type of datastore capable of supporting the conceptual data model described herein may be used. Non-limiting examples of types of databases capable of supporting the conceptual data model described herein include relational databases, hierarchical databases, and object-oriented databases. Data objects 106 are further described below with reference to FIG. 2.

In some embodiments, the replication systems 102 function to asynchronously propagate changes made to their stored data objects 106 to one or more of the other replication systems 102. For example, in a full-mesh topology, each replication system 102 may be able to propagate changes to any other replication system 102, although embodiments also support partial-mesh topologies. In an asynchronous replication scheme, each store of data objects 106 may be loosely consistent with the other stores of data objects 106. For example, each store of data objects 106 may diverge from time to time such that at any given moment, one replication system's view of the body of data may be different from another replication system's view of the body of data. In the absence of new changes, the data objects 106 may be expected to eventually become consistent with one another. In some embodiments, as well as being loosely consistent with one another, the data objects 106 can also be said to be eventually consistent.

In the example of FIG. 1, the data objects 106 may include one or more immutable components. For example, an immutable component may comprise one or more content items (e.g., a file, binary, and the like) that may not be modified. Accordingly, the replication systems 102 may effectively modify a component (e.g., a PDF document) by adding a new immutable component (e.g., a second version of the PDF document), and/or removing an existing immutable component.

In some embodiments, the replication systems 102 function to replicate data objects 106 across low-quality communication networks (e.g., high latency and/or low bandwidth communication networks). In some embodiments, the replication systems 102 function to replicate data objects 106 using other types of transmission mediums (e.g., non-transitory computer readable mediums) In order to reduce an amount of data being replicated, the replication systems 102 may selectively replicate portions of data objects 106 (e.g., particular immutable components). In some embodiments, each data object 106 and/or component may be associated with a hash (e.g., a SHA-256 hash) which may be used to select the portions for replication. For example, if a replication system 102 is scheduled to replicate a data object 106 to another replication system 102, the replication system 102 may compare the corresponding hashes of the corresponding data objects 106 and/or components to identify which data objects 106 and/or components the other replication system 106 has already stored or otherwise touched. For sake of illustrative clarity, reference to a data object 106 may include a data object 106 and/or one or more components. Accordingly, replication systems 102 can send data objects 106 to other replication systems 102 that have not already stored those data objects 106, and not send data objects 106 to other replication system 102 that have already stored those data objects 106. This can, for example, reduce the amount of data being replicated, lower data transfer times, and/or lower synchronization times.

In the example of FIG. 1, the communication network 104 may represent one or more computer networks (e.g., LAN, WAN, or the like) or other transmission mediums. The communication network 104 can provide communication between replication systems 102 and/or other systems described herein. In some embodiments, the communication network 104 comprises one or more computing devices, routers, cables, buses, and/or other network topologies (e.g., mesh, hub-and-spoke, and the like). In some embodiments, the communication network 104 may be wired and/or wireless. In various embodiments, the communication network 104 may comprise the Internet, one or more wide area networks (WANs) or local area networks (LANs), one or more networks that may be public, private, IP-based, non-IP based, and so forth. Communication networks and transmission mediums are discussed further herein. In various embodiments, the communication network 104 comprises any transitory or non-transitory computer readable medium (e.g., CD. DVD, and the like).

Figure 2:
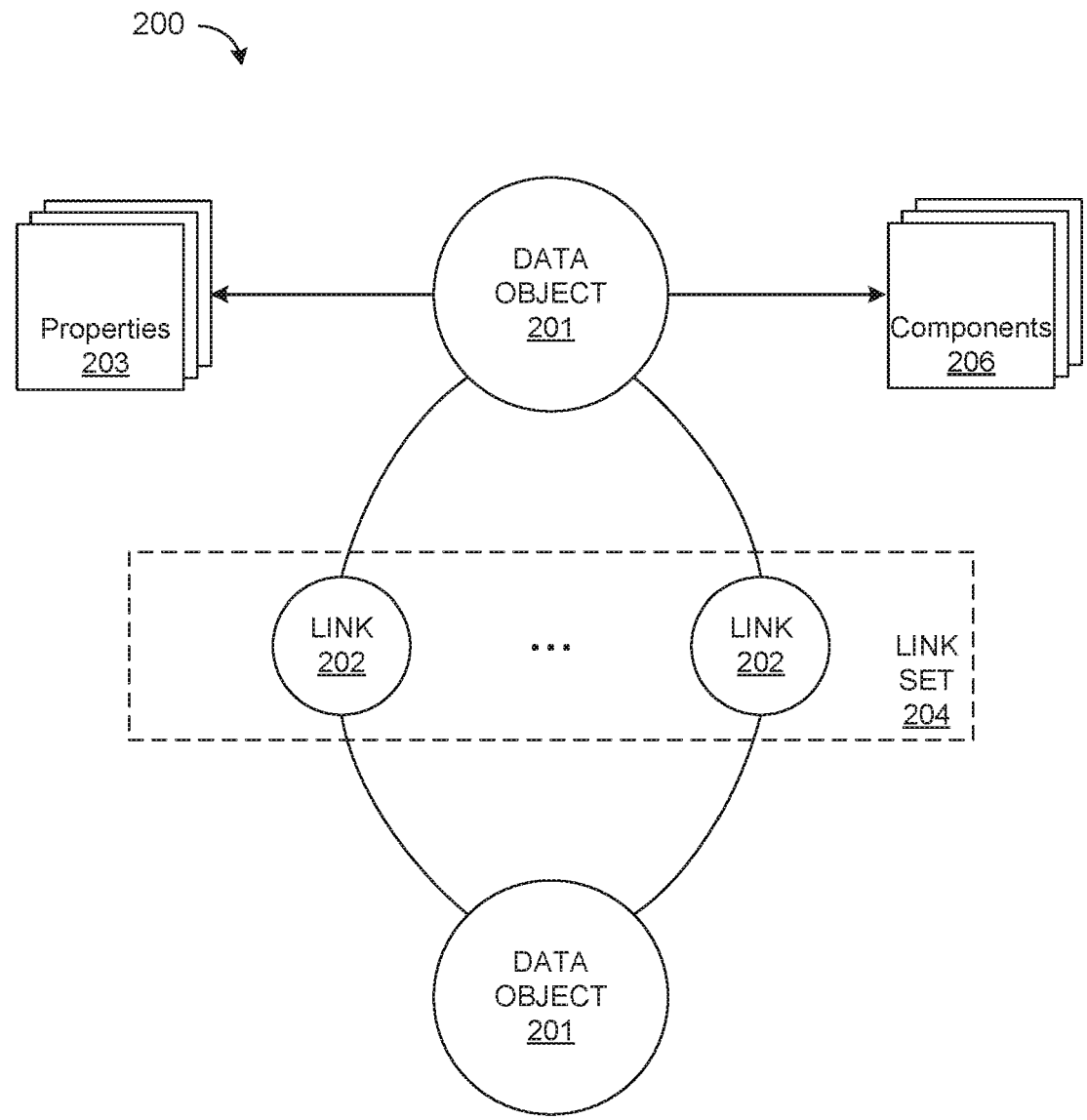
FIG. 2 depicts an object-centric conceptual data model according to some embodiments.

FIG. 2 depicts an example of an object-centric conceptual data model 200 according to some embodiments. The model 200 is centered on the notion of a data object 201. At the highest level of abstraction, the data object 201 can be a container for information representing things in the world. For example, the data object 201 can represent an entity such as a person, a place, an organization, or other noun. The data object 201 can represent an event that happens at a point in time or for a duration. The data object 201 can represent a document or other unstructured data source such as an e-mail message, a news report, or a written paper or article. In some embodiments, each data object 201 is associated with a unique identifier that uniquely identifies the data object within system 100. Each data object 201 may also have a type (e.g., Person, Event, or Document) and a display name which may be the value of a particular property of the data object.

In some embodiments, the data object 201 may have one or more properties 203. Properties 203 are attributes of the data object 201 that represent individual data items. Each property 203 of a data object 201 may have a type and a value. Different types of data objects may have different types of properties. For example, a Person data object might have an Eye Color property and an Event object might have a Date property. In one embodiment, the set of data object types and the set of property types for each type of data object supported by the system 100 are defined according to a pre-defined or user-defined ontology or other hierarchical structuring of knowledge through sub-categorization of object types and property types according to their relevant and/or cognitive qualities. In addition, data model 200 may support property multiplicity. In particular, a data object 201 may be allowed to have more than one property 203 of the same type. For example, a Person data object might have multiple Address properties or multiple Name properties.

Each link 202 may represent a connection between two data objects 201. In one embodiment, the connection is either through a relationship, an event, or through matching properties.

A relationship connection may be asymmetrical or symmetrical. For example, Person data object A may be connected to Person data object B by a Child Of relationship (where Person data object B has an asymmetric Parent Of relationship to Person data object A), a Kin Of symmetric relationship to Person data object C, and an asymmetric Member Of relationship to Organization data object X. The type of relationship between two data objects may vary depending on the types of the data objects. For example, Person data object A may have an Appear In relationship with Document data object Y or have a Participate In relationship with Event data object E.

As an example of an event connection, two Person data objects may be connected by an Airline Flight data object representing a particular airline flight if they traveled together on that flight, or by a Meeting data object representing a particular meeting if they both attended that meeting. In one embodiment, when two data objects are connected by an event, they are also connected by relationships, in which each object has a specific relationship to the event, such as, for example, an Appears In relationship.

As an example of a matching properties connection, two Person data objects representing a brother and a sister, may both have an Address property that indicates where they live. If the brother and the sister live in the same home, then their Address properties likely contain similar, if not identical information. In one embodiment, a link between two data objects may be established based on similar or matching properties of the data objects.

The above are just some examples of the types of connections that may be represented by a link and other types of connections may be represented. Thus, it should be understood that embodiments of the invention are not limited to any particular types of connections between data objects. For example, a document might contain two different tagged entities. A link between two data objects may represent a connection between these two entities through their co-occurrence within the same document.

Each data object 201 can have multiple links with another data object 201 to form a link set 204. For example, two Person data objects representing a husband and a wife could be linked through a Spouse Of relationship, a matching property (Address), and an event (Wedding).

The component(s) 206 may comprise one or more content items. In some embodiments, some or all of the components 206 are immutable.

In some embodiments, the data model 200 supports object and/or component resolution (collectively, object resolution). Object resolution may include a user and/or an automated computing process determining that two or more separate data objects 201 actually represent the same real-world entity and invoking a function of the system 100 so that the separate data objects 201 appear to users of the system 100 as if they were a single data object. In one embodiment, when one data object 201 is resolved together with another data object 201 the properties and links of one data object are copied to the other data object and then deleted from the data object from which they were copied. However, both data objects may still be retained by the system. As well as facilitating the ability to un-resolve data objects that were previously resolved together, retaining data objects after resolving them together may facilitate detection and deconfliction of conflicts.

Figure 3:
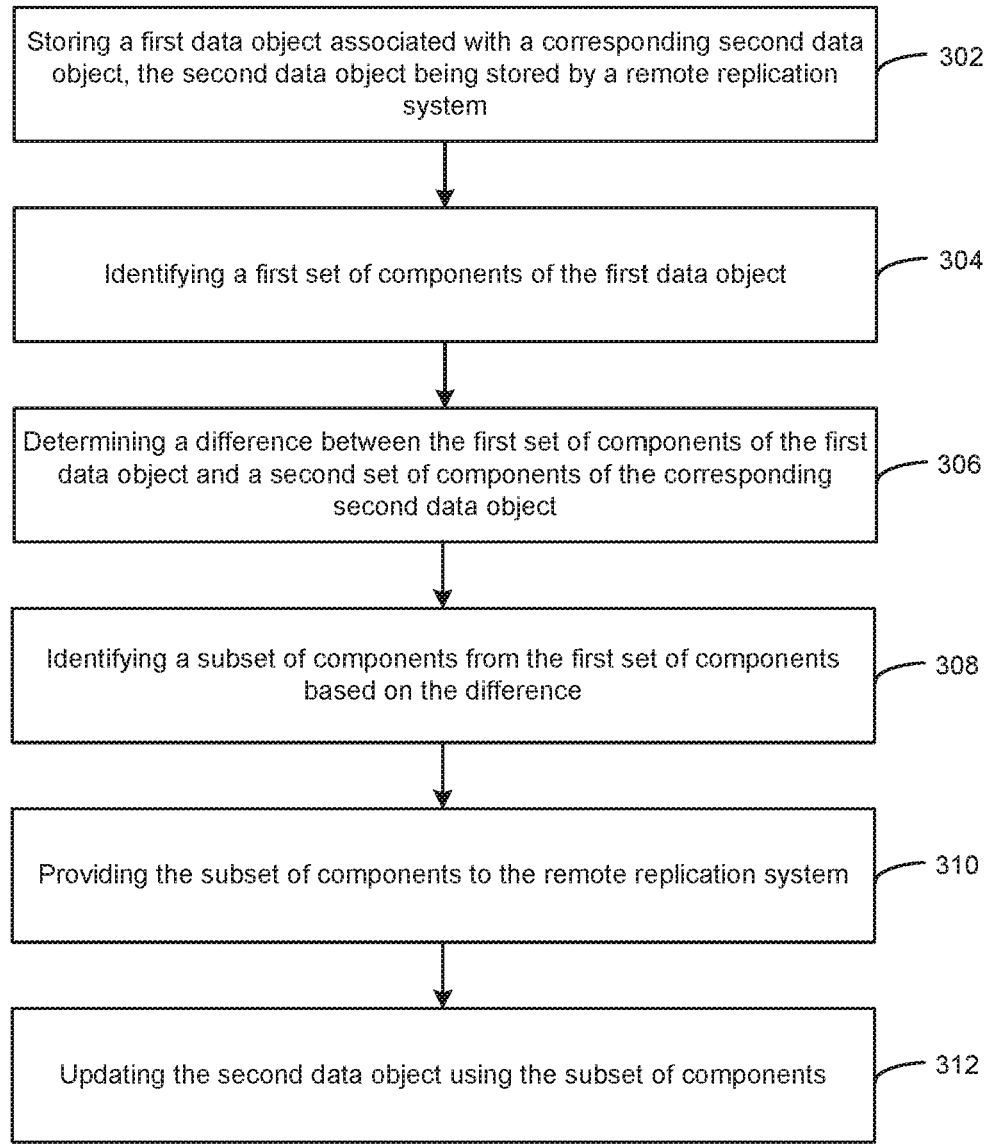
FIG. 3 depicts a flowchart of an example of a method for sharing data objects between replication systems according to some embodiments.

FIG. 3 depicts a flowchart 300 of an example of a method for sharing data objects between replication systems according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 302, a replication system stores a first data object comprising a first set of immutable components, the first data object being associated with a corresponding second data object stored by a remote replication system. For example, the replication system and the remote replication system may each comprise a node in a full-mesh or partial-mesh replication network system.

In step 304, the replication system identifies a first set of immutable components of the first data object. For example, the first set of immutable components may be identified based on respective unique identifiers (e.g., string value) and respective hash values associated with the immutable components. In some embodiments, the first set of immutable components comprises some or all of the immutable components of the first data object. In some embodiments, the first set of immutable components may be identified based on one or more characteristics of the immutable components and/or communication network. For example, a threshold file size (e.g., 10 MB) may be predetermined or dynamically determined, and the replication system may identify any immutable components greater than the threshold file size. Similarly, a threshold transfer time may be predetermined or dynamically determined, and the replication system may identify any immutable components predicted to take longer than the threshold time to transfer to an intended destination (e.g., remote replication system). The threshold values and/or the transfer times may be predicted based on performance characteristics (e.g., latency and/or bandwidth) of the communication network.

In step 306, the replication system determines a difference between the first set of immutable components of the first data object and a second set of immutable components. The second set of immutable components may be associated with the second data object, although some or all of the second set of immutable components may be associated with one or more other data objects instead of the second data objects, or not be associated with any data object. In some embodiments, each immutable component is assigned a unique identifier (e.g., a string value) and a content identifier (e.g., a hash value). The replication system may compare respective hash values for corresponding components (e.g., components having the same identifier) and determine a difference based on the comparison.

In step 308, the replication system identifies a subset of immutable components from the first set of immutable components based on the difference. For example, the subset of components may comprise any component that is different from a corresponding immutable component (e.g., indicating the components has been modified) or that does not have a corresponding immutable component (e.g., indicating the immutable component is new).

In step 310, the replication system provides the subset of immutable components from the first set of immutable components to the remote replication system over a communication network, thereby facilitating an update of the second data object using the subset of immutable components.

Deconflicting Concurrent Changes Using Multiple Acknowledgment Version Vectors

Figure 4:
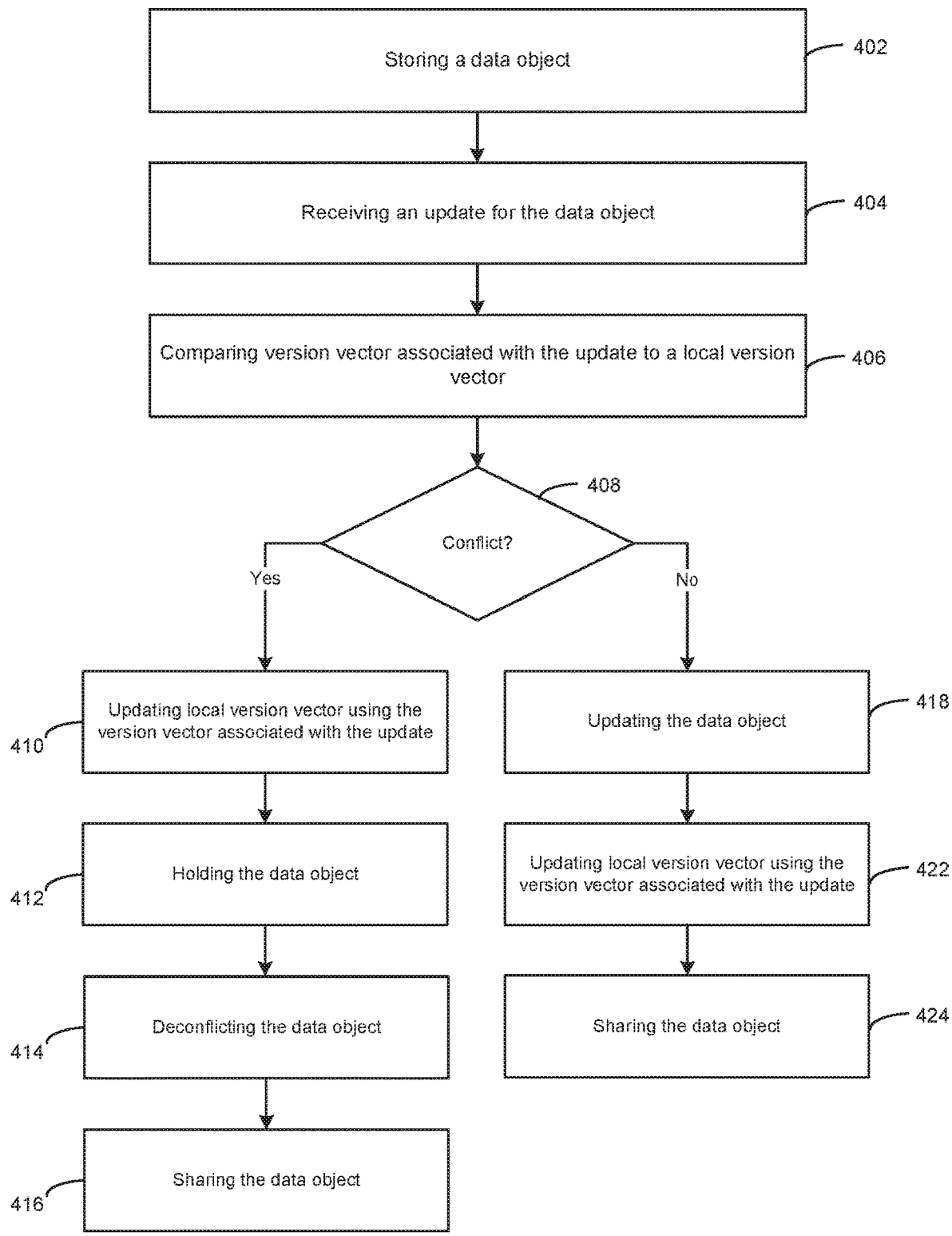
FIG. 4 depicts a flowchart of an example of a method for detecting and handling conflicts involving concurrent changes to a data object shared between replication systems according to some embodiments.

FIG. 4 depicts a flowchart 400 of an example of a method for detecting and handling conflicts involving concurrent changes to a data object shared between replication systems according to some embodiments.

In step 402, a first replication system stores a data object. For example, the first replication system can store the data object in a local datastore. In step 404, the first replication system receives an update for the data object. For example, the first replication system may receive the update from another replication system over a communication network. The update may include data that represents a change to the data object including an identifier of the changed data object and data that represents a version vector for the changed data object. The version vector may represent the version of the data object at the replication system that made the change immediately after the change was made.

Generally, a version vector is a mechanism for tracking changes in distributed systems. For example, a replication system can maintain a version vector for each data object stored by the replication system. In some embodiments, each element of the version vector may hold a single value representing a logical clock for the associated data object at the replication system corresponding to the element. However, this may not allow the replication system to acknowledge multiple versions of the same object, which may require the replication system to include all of the concurrent changes (e.g., all of the different versions of a file associated with the data object) on each export to ensure conflicts are resolved. In some embodiments, the replication systems may use multiple acknowledgement version vectors that may hold one or more version clock acknowledgements for each of the replication systems. This may allow the concurrent changes (or, "conflicts") to be deconflicted without having to export the concurrent changes to other replication systems. This can reduce the amount of data being replicated, which can allow, for example, replication systems to effectively utilize low quality communication networks and/or other transmission mediums.

In step 406, the first replication system compares the version vector associated with the update to a local version vector to determine whether any concurrent changes have been made to the data object by one or more other replication systems (step 408). If there are any concurrent changes, a conflict is detected, and the method 400 proceeds to step 410.

In step 410, the replication system updates the local version vector using the version vector associated with the update, and holds the data object from replication (step 412). For example, the data object may be entered into a pending conflicts structure (e.g., queue), and prevented from further replication until the one or more conflicts are resolved (step 414). In some embodiments, conflicts are resolved manually. For example, a user (e.g., an administrator) can indicate which version of the data object is correct. Once the conflict is resolved, the hold may be removed, and the data object may be provided one or more other replication systems, along with the updated version vector (Step 416).

If, at step 408, the replication system determines a conflict does not exist, then the method proceeds to step 418. In step 418, the replication system updates the object using the obtained update. For example, the update can include modifying parameters and/or components of the data object, removing immutable components, and/or adding immutable components. In step 420, the replication system updates the local version vector using the version vector associated with the update. In step 422, the replication system provides the updated data object and version vector to one or more other replication systems.

Automatic Reordering of Replication Actions

Figure 5:
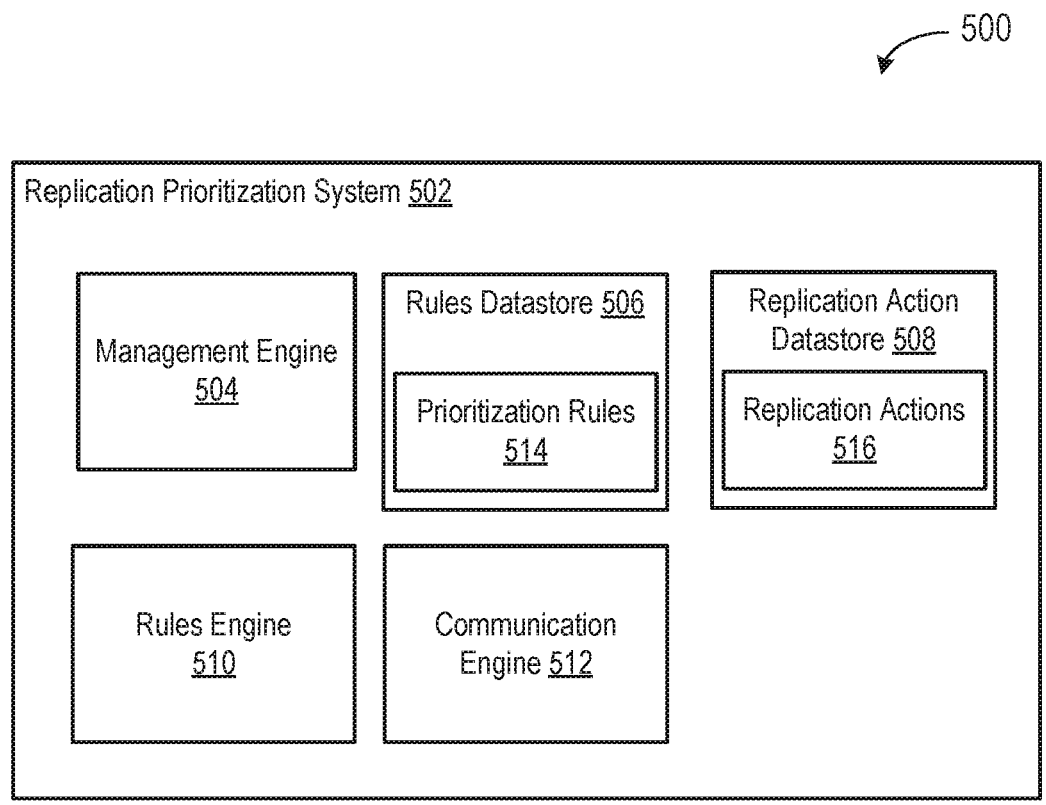
FIG. 5 depicts a diagram of an example of a replication prioritization system according to some embodiments.

FIG. 5 depicts a diagram 500 of an example of a replication prioritization system 502 according to some embodiments. In various embodiments, functionality of the replication prioritization system 502 can be performed by one or more servers, workstations, desktop computers, laptop computers, mobile devices, and the like. In the example of FIG. 5, the replication prioritization system 502 includes a management engine 504, a rules datastore 506, a replication action datastore 508, a rules engine 510, and a communication engine 510. In some embodiments, some or all of the functionality of the replication prioritization system 502 may be implemented as a portion of a replication system or other system (e.g., a central server).

In the example of FIG. 5, the management engine 504 functions to manage (e.g., create, read, update, delete, or otherwise access) prioritization rules 514 stored in the rules datastore 506, and replication actions 516 stored in the replication action datastore 508. The management engine 504 can perform any of these operations manually (e.g., by a user interacting with a GUI), automatically (e.g., triggered by one or more of the engine 510 or 512, discussed below), or both. In some embodiments, the management engine 504 comprises a library of executable instructions which are executable by a processor for performing any of the aforementioned management operations. The datastores 506 and 508 may be any structure and/or structures suitable for storing the rules 514 and replication actions 516. For example, the datastores 506 and 508, like other datastore herein, may comprise a queue, a cache, a buffer, a relational database, an active database, a self-referential database, a table, a matrix, an array, a flat file, a non-relational No-SQL system, and the like.

In some embodiments, the prioritization rules 514 define attributes and/or functions for prioritizing replication actions 516. The replication actions 516 may include export actions, import actions, and other actions performed in connection with replicating data objects. In some embodiments, the replication actions 516 may be prioritized on a first-in-first-out out (FIFO) basis. For example, if an export action 516 is scheduled before an import action 516 in the datastore 508, the rules engine 510 may process that export action 516 before the import action 516. However, in some embodiments, FIFO may have drawbacks. For example, the importing replication system may benefit from data that would be obtained by the exporting replication system had the exporting replication system processed the import action 516 before the export action 516. Accordingly, the rules 514 may provide functionality to reorder replication actions 516. For example, the prioritization rules 514 may reorder and/or trigger processing of replication actions 516 based on some or all of the following:

All replication actions 516 will join at the end of a queue (e.g., implemented by datastore 508), ordered by corresponding identifiers (e.g., timestamps).

No replication action 516 may be reordered ahead of another replication action 516 of the same type. For example, an export action 516 may not be reordered ahead of another export action 516, and an import action 516 may not be reordered ahead of another import action 516.

Export actions 516 may not be reordered of import actions 516.

Export actions 516 may be processed concurrently with one or more other export actions 516.

Import actions 516 may be processed one at a time based on export action(s) 516. For example, a set of dependencies may be associated with an export action 516. If the export action 516 depends on an import action 516 in the queue, and that import action 516 is lower in the queue, that import action 516 may be reordered ahead of the dependent export action 516.

In the example of FIG. 5, the rules engine 510 functions to process the replication actions 516 and/or the reorder replication actions 516 according to the rules 514. For example, the rules engine may concurrently process export replication actions 516 and process import actions 516 one at a time.

In the example of FIG. 5, the communication engine 512 functions to send requests, transmit and, receive communications, and/or otherwise provide communication with one or a plurality of systems. In some embodiments, the communication engine 512 functions to encrypt and decrypt communications. The communication engine 512 may function to send requests to and receive data from a system through a network or a portion of a network. Depending upon implementation-specific or other considerations, the communication engine 512 may send requests and receive data through a connection, all or a portion of which may be a wireless connection. The communication engine 512 may request and receive messages, and/or other communications from associated systems.

On-Demand and Scheduled Replication of Data Objects

Figure 6:
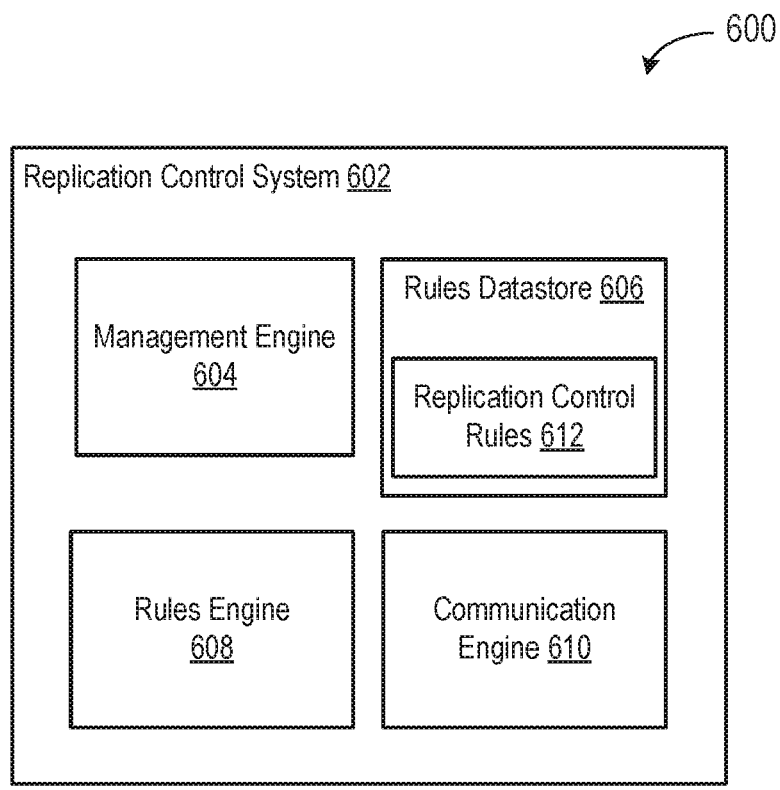
FIG. 6 depicts a diagram of an example of a replication control system according to some embodiments.

FIG. 6 depicts a diagram of an example of a replication control system 602 according to some embodiments. In various embodiments, functionality of the replication control system 602 can be performed by one or more servers, workstations, desktop computers, laptop computers, mobile devices, and the like, and the like. In the example of FIG. 6, the replication control system 602 includes a management engine 604, a rules datastore 606, a rules engine 608, and a communication engine 610. In some embodiments, some or all of the functionality of the replication control system 602 may be implemented as a portion of a replication system or other system (e.g., a central server).

In the example of FIG. 6, the management engine 604 functions to manage (e.g., create, read, update, delete, or otherwise access) replication control rules 612 stored in the rules datastore 606. The management engine 604 can perform any of these operations manually (e.g., by a user interacting with a GUI), automatically (e.g., triggered by one or more of the engines 608 or 610, discussed below), or both. In some embodiments, the management engine 604 comprises a library of executable instructions which are executable by a processor for performing any of the aforementioned management operations. The rules datastore 606 may be any structure and/or structures suitable for storing the rules 612.

In some embodiments, the replication control rules 612 define attributes and/or functions for scheduling replications. For example, replications may comprise various replication actions, and may be user defined and/or automatically determined. In some embodiments, replications may be dynamically scheduled based on communication network quality, performance load characteristics (e.g., of the communication network), and the like. This may help ensure, for example, that network connections do not become saturated, or that performance is not otherwise negatively impacted.

In some embodiments, replications may performed at one or more predetermined periods (e.g., every hour, every day, every week, and the like) and/or on-demand. For example, a user may select a subset of objects from a set of objects, and select particular times and/or periods to replicate the selected objects. This may help prevent, for example, performance degradation on low quality communication networks by not performing redundant or otherwise undesired replications.

In the example of FIG. 6, the rules engine 608 functions to execute replication control rules 612 to process replications and/or schedule replications. For example, the rules engine 608 can execute replication control rules 612 to schedule "background" replications at predetermined intervals and/or on-demand replications as needed to satisfy user and/or performance requirements.

In the example of FIG. 6, the communication engine 610 functions to send requests, transmit and, receive communications, and/or otherwise provide communication with one or a plurality of systems. In some embodiments, the communication engine 610 functions to encrypt and decrypt communications. The communication engine 610 may function to send requests to and receive data from a system through a network or a portion of a network. Depending upon implementation-specific or other considerations, the communication engine 610 may send requests and receive data through a connection, all or a portion of which may be a wireless connection. The communication engine 610 may request and receive messages, and/or other communications from associated systems.

Hub-and-Spoke Network Replication System

Figure 7:
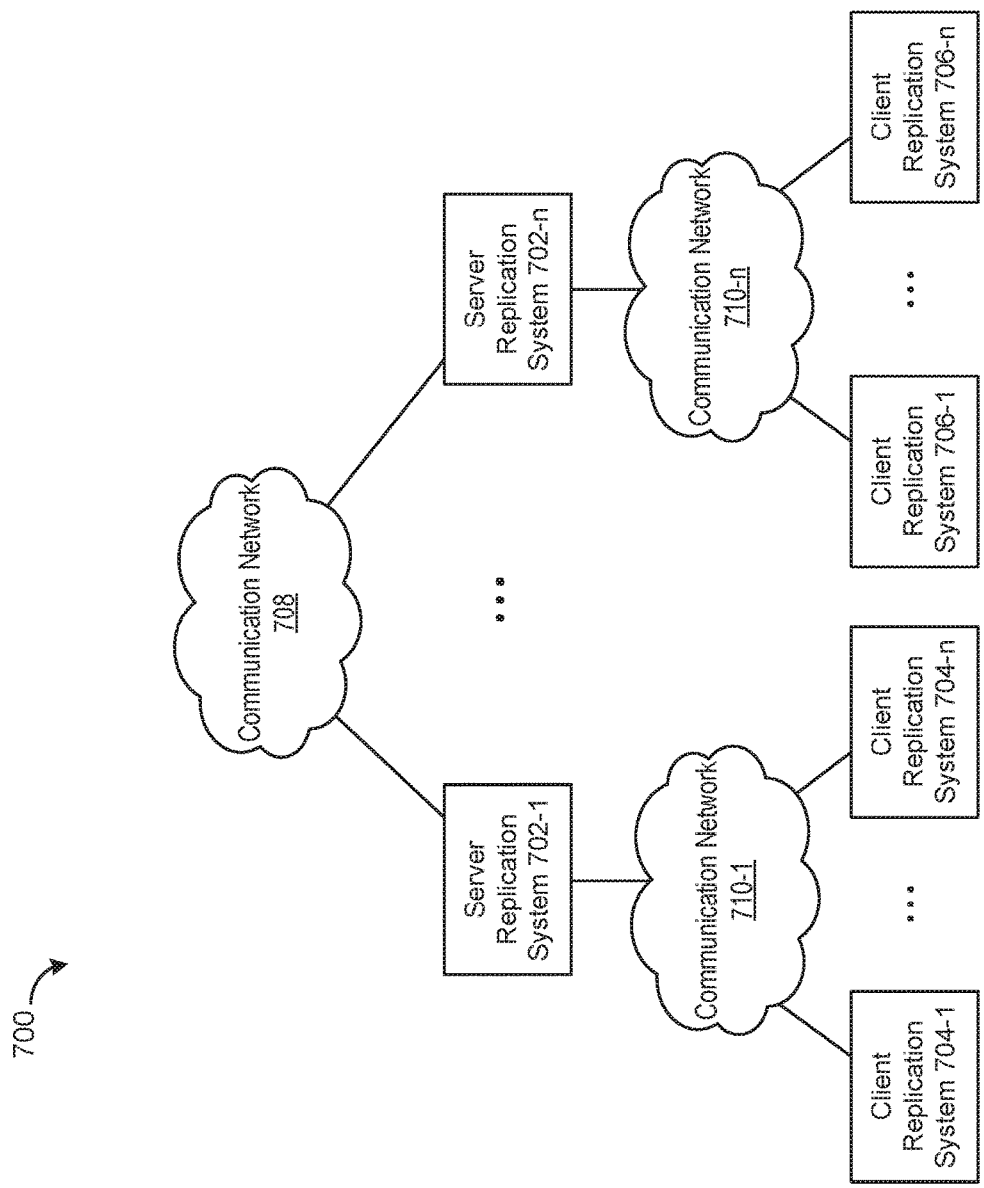
FIG. 7 depicts a diagram of an example of a hub-and-spoke network replication system for sharing data objects between replication systems according to some embodiments.

FIG. 7 depicts a diagram of an example of a hub-and-spoke network replication system 702 for sharing data objects between replication systems according to some embodiments. In the example of the FIG. 7, the system 702 includes server replication systems 702-1 to 702-$n$ (individually, the server replication system 702, collectively, the server replication systems 702), client replications systems 704-1 to 704-$n$ (individually, the client replication systems 704, collectively, the client replication systems 704), client replications systems 706-1 to 706-$n$ (individually, the client replication system 706, collectively, the client replication systems 706), communication network 708, and communication networks 710-1 to 710-$n$ (individually, the communication network 710, collectively, the communication networks 710).

In some embodiments, as described elsewhere herein, replication systems may use version vectors to track replicated data objects. However, as data objects are replicated, version vectors may increase in data size, which may negatively impact system performance. Typically, each replication system may add data to version vectors when modifying or otherwise touching a data object, however not all such data is necessary to track and synchronize data objects. Accordingly, in some embodiments, server replication systems 702 and client replication systems 704 and 706 may be communicatively coupled according to a hub-and-spoke network model where each server replication system 702 (or, "hub") is communicatively coupled to one or more other server replication systems 702, and each client replication system 704 and 706 (or, "spoke") is communicatively coupled with one respective server replication system 702. The server replication systems 702 may be configured to hide their associated client systems 704 from the other server replication systems 702 such that the other server replication systems 702 are unaware of client replication systems 704 and/or 706 associated with other server replication systems 702. This may allow, for example, additional client replication systems 704 and/or 706 to be added to the system 702 without contributing to version vector bloat.

Hardware Implementation

Figure 8:
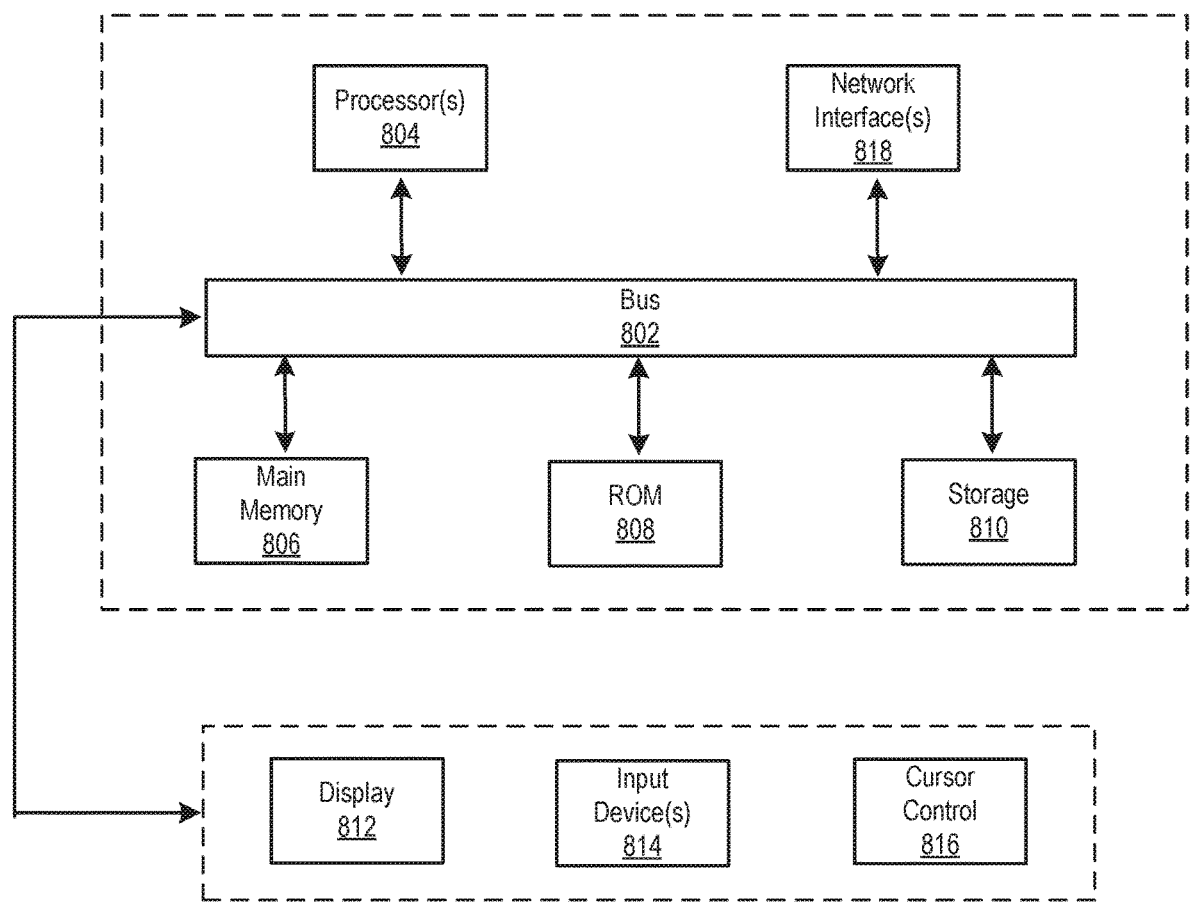
FIG. 8 depicts a block diagram of an example of a computer system upon which any of the embodiments described herein may be implemented.

FIG. 8 depicts a block diagram of an example of a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A system comprising:
one or more processors; and
a memory storing instructions that, when executed by the one or more processors, cause the system to perform:
storing a first data object by a first replication system comprising a first set of immutable components, the first data object being associated with a corresponding second data object stored by a remote replication system;
determining a difference between the first set of immutable components of the first data object and a second set of immutable components of the corresponding second data object;
identifying a subset of immutable components from the first set of immutable components based on the difference; and
scheduling a first export action or a second export action to export the subset from the first replication system that provides, over a communication network, the subset to the remote replication system, the scheduling further comprising:
determining whether the first export action or the second export action is dependent on an import action to the first replication system; and
based on the determining of whether the first export action or the second export action is dependent on the import action, and in response to the first export action being scheduled behind the second export action, selectively rescheduling the first export action or the second export action to be concurrent with each other.

2. The system of claim 1, wherein the scheduling further comprises scheduling import actions one at a time.

3. The system of claim 1, wherein the scheduling comprises refraining from reordering a priority of the import action or the first export action with respect to a different import action.

4. The system of claim 1, wherein the scheduling comprises refraining from reordering the first export action to occur ahead of the second export action.

5. The system of claim 1, wherein the scheduling of the first export action is based on a predicted saturation state of a network connection resulting from the first export action.

6. The system of claim 1, wherein the instructions further cause the system to propagate version clock acknowledgements corresponding to both the first replication system and the remote replication system to corresponding acknowledgement version vectors stored in the first replication system, wherein each of the corresponding acknowledgement version vectors receive a respective version clock acknowledgement of the version clock acknowledgements.

7. The system of claim 1, wherein the instructions further cause the system to propagate version clock acknowledgements corresponding to both the first replication system and the remote replication system to corresponding second acknowledgement version vectors stored in the remote replication system, wherein each of the corresponding second acknowledgement version vectors receive a respective version clock acknowledgement of the version clock acknowledgements.

8. The system of claim 1, wherein the first set of immutable components comprises one or more immutable components selected based on a respective file size relative to a threshold size value.

9. The system of claim 8, wherein the threshold value comprises a dynamic threshold size value determined based on one or more performance characteristics of the communication network.

10. The system of claim 9, wherein the one or more performance characteristics comprise any of a latency or a bandwidth.

11. The system of claim 1, wherein the first set of immutable components comprises one or more immutable components selected based on a respective predicted transfer time relative to a threshold transfer time value.

12. A method being implemented by a computing system including one or more physical processors and storage media storing machine-readable instructions, the method comprising:
storing a first data object by a first replication system comprising a first set of immutable components, the first data object being associated with a corresponding second data object stored by a remote replication system;
determining a difference between the first set of immutable components of the first data object and a second set of immutable components of the corresponding second data object;
identifying a subset of immutable components from the first set of immutable components based on the difference; and
scheduling a first export action or a second export action to export the subset from the first replication system that provides, over a communication network, the subset to the remote replication system, the scheduling further comprising:
determining whether the first export action or the second export action is dependent on an import action to the first replication system; and
based on the determining of whether the first export action or the second export action is dependent on the import action, and in response to the first export action being scheduled behind the second export action, selectively rescheduling the first export action or the second export action to be concurrent with each other.

13. The method of claim 12, wherein the scheduling further comprises scheduling import actions one at a time.

14. The method of claim 12, wherein the scheduling comprises refraining from reordering a priority of the import action or the first export action with respect to a different import action.

15. The method of claim 12, wherein the scheduling comprises refraining from reordering the first export action to occur ahead of the second export action.

16. The method of claim 12, wherein the scheduling of the first export action is based on a predicted saturation state of a network connection resulting from the first export action.

17. The method of claim 12, further comprising:
propagating version clock acknowledgements corresponding to both the first replication system and the remote replication system to corresponding acknowledgement version vectors stored in the first replication system, wherein each of the corresponding acknowledgement version vectors receive a respective version clock acknowledgement of the version clock acknowledgements.

18. The method of claim 12, further comprising:
propagating version clock acknowledgements corresponding to both the first replication system and the remote replication system to corresponding acknowledgement version vectors stored in the first replication system, wherein each of the corresponding acknowledgement version vectors receive a respective version clock acknowledgement of the version clock acknowledgements.

19. A non-transitory computer readable medium comprising instructions that, when executed, cause one or more processors to perform:
storing a first data object by a first replication system comprising a first set of immutable components, the first data object being associated with a corresponding second data object stored by a remote replication system;
determining a difference between the first set of immutable components of the first data object and a second set of immutable components of the corresponding second data object;
identifying a subset of immutable components from the first set of immutable components based on the difference; and
scheduling a first export action or a second export action to export the subset from the first replication system that provides, over a communication network, the subset to the remote replication system, the scheduling further comprising:
determining whether the first export action or the second export action is dependent on an import action to the first replication system; and
based on the determining of whether the first export action or the second export action is dependent on the import action, and in response to the first export action being scheduled behind the second export action, selectively rescheduling the first export action or the second export action to be concurrent with each other.

20. The non-transitory computer readable medium of claim 19, wherein the scheduling further comprises scheduling import actions one at a time.

* * * * *